United States Patent [19]

Moore et al.

[11] 4,133,780

[45] Jan. 9, 1979

[54] POLYURETHANE FOAMS PREPARED FROM CONDENSATION PRODUCTS OF AMINES, EPIHALOHYDRINS AND ALKYLENE OXIDES

[75] Inventors: Richard A. Moore; Louis C. Pizzini, both of Trenton; John T. Patton, Jr., Wyandotte, all of Mich.

[73] Assignee: BASF Wyandotte Corporation, Wyandotte, Mich.

[21] Appl. No.: 806,567

[22] Filed: Jun. 14, 1977

Related U.S. Application Data

[63] Continuation-in-part of Ser. No. 610,142, Sep. 4, 1975, abandoned.

[51] Int. Cl.$^2$ .............................................. C08G 18/32

[52] U.S. Cl. ................................................. 521/167
[58] Field of Search ................................. 260/2.5 AQ

[56] References Cited

U.S. PATENT DOCUMENTS

| 3,336,245 | 8/1967 | Britain | 260/2.5 AQ |
| 3,925,266 | 12/1975 | Fabris et al. | 260/2.5 AQ |

Primary Examiner—V. P. Hoke
Attorney, Agent, or Firm—Robert J. Henry; Bernhard R. Swick; Robert E. Dunn

[57] ABSTRACT

Oxyalkylated condensation products prepared from aliphatic and aromatic amines, epihalohydrin and alkylene oxides are used in the preparation of polyurethane foams.

5 Claims, No Drawings

POLYURETHANE FOAMS PREPARED FROM CONDENSATION PRODUCTS OF AMINES, EPIHALOHYDRINS AND ALKYLENE OXIDES

CROSS REFERENCE TO RELATED APPLICATIONS

The present application is a continuation-in-part of our copending application Ser. No. 610,142, filed Sept. 4, 1975 and entitled "CONDENSATION PRODUCTS OF AMINES, EPIHALOHYDRINS AND ALKYLENE OXIDES", now abandoned.

BACKGROUND OF THE INVENTION

1. Field of the Invention

This invention relates to polyurethane cellular forms prepared by the reaction of polyisocyanates and amine epichlorohydrin condensation products and oxyalkylated derivatives thereof.

2. Prior Art

U.S. Pat. No. 2,938,004 teaches the preparation of condensation products of diamines with alkylene oxides. It teaches the preparation of glycidyl ethers and the reaction of these glycidyl ethers with diamines as crosslinking agents. Further disclosures include the reaction of alkyl glycidyl ether, glycidyl propionate, and styrene oxide, with diamines. The epoxides disclosed in this patent are incapable of preparing the oxyalkylated products which are employed in the polyurethane foams of the subject invention.

U.S. Pat. No. 3,336,245 discloses the use of certain oxyalkylated amines in the preparation of urethane foam. The structures disclosed in this patent are dissimilar from the product produced in the instant invention. Further, the product structure in the claims and the disclosure of the patent make it obvious that the products of the subject invention employed in the preparation of polyurethane foams are not anticipated. If epichlorohydrin were used in the synthesis of the compounds of this patent one would not obtain products which correspond to the products disclosed in this patent.

SUMMARY OF THE INVENTION

The polyurethane cellular foams of this invention are prepared by reacting an organic polyisocyanate with oxyalkylated epihalohydrin condensation product and condensation products prepared in the following manner. At least two moles of amine are reacted with one mole of epihalohydrin followed by neutralization of the resultant hydrogen chloride with aqueous inorganic base equivalent to the amount of epihalohydrin employed. The oxyalkylated derivatives are then prepared by treating the above reaction products with enough alkylene oxide to react with all of the active hydrogens in the organic substance. These products can be purified and used at this stage of oxyalkylation or, preferably, catalytic amounts of a catalyst such as potassium hydroxide may be added, the reaction products stripped of water under reduced pressure and then further alkylene oxide added to achieve a higher desired molecular weight.

DESCRIPTION OF THE PREFERRED EMBODIMENT

The polyurethane cellular foams prepared in accordance with this invention are prepared by reacting an organic polyisocyanate with an oxyalkylated condensation product. The condensation products in accordance with this invention are prepared by reacting in the presence of an alkaline catalyst amines with an epihalohydrin. More specifically, at least two moles of an amine are reacted with one mole of an epihalohydrin. The resulting product is then treated with an amount of aqueous caustic equivalent to the amount of epichlorohydrin employed. The reaction proceeds to give a condensation product of amines bridged by the residue of the epihalohydrin chain. The product is then oxyalkylated in the presence of an alkaline catalyst to a desired molecular weight. In the condensation reaction the epihalohydrin acts as a difunctional compound. Various condensation products are possible depending upon the ratio of the amine to the epihalohydrin used in the condensation reaction. Furthermore, various conditions of temperature, pH and the presence of additional active hydrogen compounds will cause a variation in the condensation product produced. The reaction can be used to prepare, for example, an aromatic amine chlorohydrin intermediate followed by the addition of either aliphatic amines, diamines, or even ammonia to give mixtures of aromatic amines linked to aliphatic amines. It is contemplated that among the amines which may be employed are the aliphatic, olefinic, aromatic, alicyclic, alkyl aryl, alkyl alicyclic and alkyl heterocyclic amines, heterocyclic primary monoamines, primary and secondary polyamines and alkanolamines. Examples of these include methylamine, ethylamine, propylamine, allylamine, butylamine, amylamine, cyclohexylamine, 1,3-dimethylbutylamine, bis(1,3-dimethylbutyl)amine, 2-aminoheptane, 2-amino-4-methylhexane, 1,4-dimethylpentylamine, 2-ethylhexylamine, bis(2-ethylhexyl)amine, 1-cyclopentyl-2-aminopropane, bis(1-ethyl-3-methylpentyl)amine, 1,1,3,3-tetramethylbutylamine, hexylamine, heptylamine, octylamine, dodecylamine, tetradecylamine, hexadecylamine, octadecylamine, docosylamine, ethylenediamine, N-(2-hydroxypropyl)ethylene diamine, diethylenetriamine, triethylenetetramine, tetraethylenepentamine, pentaethylenehexamine, propylene diamine, 1,3-diaminopropane, iminobispropylamine, tetramethylenediamine, hexamethylenediamine and methanediamine.

Suitable aromatic amines include:
2,4-tolylene diamine,
2,6-tolylene diamine, or mixtures thereof;
1,5-naphthalene diamine,
1,4-naphthalene diamine,
4,4'-diphenyl methane diamine,
4,4'-diamino-3,3'-dichlorodiphenyl methane,
4,4'-diamino-3,3'-dimethyl diphenyl methane,
4,4'-diamino-3,3'-dimethoxy diphenyl methane,
4,4'-diamino diphenyl dimethyl methane,
4,4',2-triamino-3,3'-dimethyl diphenyl methane,
diamino biphenyl,
phenylene diamine,
tolylene triamine,
naphthalene triamine,
xylylene diamine,
xylylene triamine,
3,3'-dichloro-4,4'-diaminodiphenylene,
3,3'-dibromo-4,4'-diaminodiphenylene,
3,3'-dimethyl-4,4'-diaminodiphenylene,
3,3'-diisopropoxy-4,4'-diaminodiphenylene,
3,3'-diethyl-4,4'-diaminodiphenylene,
3,3'-dipropyl-4,4'-diaminodiphenylene,
3,3'-dibutyl-4,4'-diaminodiphenylene,
3,3'-diisopropyl-4,4'-diaminodiphenylene, 3,3'-diisobutyl-4,4'-diaminodiphenylene,
3,3'-dimethoxy-4,4'-diaminodiphenylene,
3,3'-diisopropoxy-4,4'-diaminodiphenylmethane,
3,3'-dimethyl-4,4'-diaminodiphenylmethane,
3,3'-diethyl-4,4'-diaminodiphenylmethane,
3,3'-dipropyl-4,4'-diaminodiphenylmethane,
3,3'-dibutyl-4,4'-diaminodiphenylmethane,
3,3'-diisopropyl-4,4'-diaminodiphenylmethane,
3,3'-diisobutyl-4,4'-diaminodiphenylmethane,
3,3'-dimethoxy-4,4'-diaminodiphenylmethane,
3,3'-diisopropoxy-4,4'-diaminodiphenylethane,
3,3'-dimethyl-4,4'-diaminodiphenylethane,
3,3'-diethyl-4,4'-diaminodiphenylethane,
3,3'-dipropyl-4,4'-diaminodiphenylethane,
3,3'-dibutyl-4,4'-diaminodiphenylethane,
3,3'-diisopropyl-4,4'-diaminodiphenylethane,
3,3'-disobutyl-4,4'-diaminodiphenylethane,
3,3'-dimethoxy-4,4'-diaminodiphenylethane,
3,3'-diisopropoxy-4,4'-diaminodiphenylpropane,
3,3'-dimethyl-4,4'-diaminodiphenylpropane,
3,3'-diethyl-4,4'-diaminodiphenylpropane,
3,3'-dipropyl-4,4'-diaminodiphenylpropane,
3,3'-dibutyl-4,4'-diaminodiphenylpropane,
3,3'-diisopropyl-4,4'-diaminodiphenylpropane,
3,3'-diisobutyl-4,4'-diaminodiphenylpropane,
3,3'-dimethoxy-4,4'-diaminodiphenylpropane,
3-methyl-3'-ethyl-4,4'-diaminodiphenylene,
3-methyl-3'-ethyl-4,2'-diaminodiphenylene,
3-methyl-3'-ethyl-4,3'-diaminodiphenylene
3-methyl-3'-ethyl-2,4'-diaminodiphenylene,
3-methyl-3'-ethyl-3,3'-diaminodiphenylene,
3-methyl-2'-ethyl-4,4'-diaminodiphenylene,
2-chloro-3'-methoxy-4,4'-diaminodiphenylene,
3-propoxy-3'-bromine-4,4'-diaminodiphenylene,
3-methyl-3'-ethyl-4,4'-diaminodiphenylmethane,
3-methyl-2'-ethyl-4,4'-diaminodiphenylmethane
2-chloro-3'-methoxy-4,4'-diaminodiphenylmethane,
3-propoxy-3'-bromine-4,4'-diaminodiphenylmethane,
3-methyl-3'-ethyl-4,4'-diaminodiphenylethane,
3-methyl-2'-ethyl-4,4'-diaminodiphenylethane,
2-chloro-3'-methoxy-4,4'-diaminodiphenylethane,
3-propoxy-3'-bromine-4,4'-diaminodiphenylethane,
3-methyl-3'-ethyl-4,4'-diaminodiphenylpropane,
3-methyl-2'-ethyl-4,4'-diaminodiphenylpropane,
2-chloro-3'-methoxy-4,4'-diaminodiphenylpropane,
3-propoxy-3'-bromine-4,4'-diaminodiphenylpropane,
3-methyl-5-ethyl-4,4'-diaminodiphenylene,
3-methyl-5-ethyl-4,4'-diaminodiphenylmethane,
3-methyl-5-ethyl-4,4'-diaminodiphenylethane,
3-methyl-5-ethyl-4,4'-diaminodiphenylpropane,
3,5,3'-tripropyl-4,4'-diaminodiphenylene,
3,5,3'-triethoxy-4,4'-diaminodiphenylene,
3,5,3'-trimethoxy-4,4'-diaminodiphenylene,
3,5-3'-trichloro-4,4'-diaminodiphenylene,
3,5-3'-tribromo-4,4'-diaminodiphenylene,
3,5,3'-tripropoxy-4,4'-diaminodiphenylene,
3,5,3'-tripropyl-4,4'-diaminodiphenylmethane,
3,5,3'-trimethoxy-4,4'-diaminodiphenylmethane,
3,5,3'-trichloro-4,4'-diaminodiphenylmethane,
3,5,3'-tripropyl-4,4'-diaminodiphenylethane,
3,5,3'-trimethoxy-4,4'-diaminodiphenylethane,
3,5,3'-trichloro-4,4'-diaminodiphenylethane,
3,5,3'-tripropyl-4,4'-diaminodiphenylpropane,
3,5,3'-trimethoxy-4,4'-diaminodiphenylpropane,
3,5,3'-trichloro-4,4'-diaminodiphenylpropane,
2-bromo-3-propoxy-3'-methyl-4,5'-diaminodiphenylene,
2-chloro-3-ethoxy-3'-propyl-4,5'-diaminodiphenylene,
2-chloro-3-methoxy-3'-ethyl-4,5'-diaminodiphenylene,
2-bromo-3-butoxy-3'-butyl-4,5'-diaminodiphenylene,
2-chloro-3-methoxy-3'-ethyl-4,5'-diaminodiphenylmethane,
2-chloro-3-methoxy-3'-ethyl-4,5'-diaminodiphenylethane,
2-chloro-3-methoxy-3'-ethyl-4,5'-diaminodiphenylpropane,
2,3-diaminotoluene,
2,5-diaminotoluene,
3,4-diaminotoluene,
1-chloro-2,4-diaminobenzene,
1-ethoxy-2,4-diaminobenzene,
1-propyl-2,4-diaminobenzene,
1-ethyl-2,4-diaminobenzene,
1-bromo-2,4-diaminobenzene,
1-butoxy-2,4-diaminobenzene,
3-chloro-2,4-diaminobenzene,
dimethoxynaphthalene diamine,
dichloronaphthalene diamine, benzidine. Other amines which are contemplated include:
p-p'-diamino diphenyl sulfone, 1,3-diamino-4-isopropylbenzene, 1,3-diamino-4,5-diethyl benzene, diamino-stilbene, n,n'-bis-(cyclohexyl)-p-phenylenediamine, N-cyclohexyl-N'-methylcyclohexyl-p-phenylenediamine, N-methyl-N'-cyclohexyl-p-phenylenediamine, N-sec-butyl-N'-methylcyclohexyl-p-phenylenediamine, N-alkyl-N'-aryl-p-phenylenediamine wherein the aryl radicals are phenyl, tolyl, xylyl, and naphthyl, N-ethyl-N'-cyclopentyl-p-phenylenediamine, N,N'-dinonyl-p-phenylenediamine,
N,N'-dedodecyl-p-phenylenediamine,
N-methyl-N'-sec-butyl-p-phenylenediamine,
N-sec-butyl-N'-isopropyl-p-phenylenediamine,
N,N'-di-(1-methyloctyl)-p-phenylenediamine,
N-totyl-N'-cyclopentyl-p-phenylenediamine,
N-phenyl-N'-undecyl-p-phenylenediamine,
1,3-diamino-4-methylbenzene, 1,4-diamino-2-methylbenzene,
1,4-diamino-2,5-dimethylbenzene,
1,4-diamino-2-methoxybenzene, 1,4-diamino-2,5-dimethoxybenzene,
1,4-diamino-2,5-diethoxybenzene,
1,3-diamino-4,6-dimethylbenzene,
3,3'-dimethyl-4,4'-diaminodiphenyl, 3,3'-diethoxy-4,4'-diaminodiphenyl,
2,7-diaminodiphenylene oxide,
1,5-diaminoanthraquinone, 2,8-diaminochrysene,
2-(4'-aminophenyl)-6-aminobenthiazole, 2,7-diaminocarbazole, piperazine, 2-methylpiperazine, monoethanolamine, diethanolamine, aminoethylethanolamine, monoisopropanolamine, N,N'-dimethyl ethylene diamine, aminophenol and diaminophenol.

It is further contemplated that mixtures of the foregoing amines may be employed.

The epihalohydrin which is employed in this invention may be selected from the group consisting of epichlorohydrin, epibromohydrin or epiiodohydrin. Epichlorohydrin is preferred due to its lower cost and ready availability. The quantity of epihalohydrin which is contemplated for the products and process of the instant invention is directly related to the concentration of the amine employed. The molar ratio of amine to epihalohydrin employed should be at least 2 moles of amine to 1 mole of epihalohydrin and may be as much as 4 moles of amine to 1 mole of epihalohydrin, preferably a 3:1 mole ratio of amine to epihalohydrin.

The process for preparing an oxyalkylated condensation product of amine and epihalohydrin comprises:
 (a) reacting at least two moles of amine with 1 mole of epihalohydrin,
 (b) adding to the product of step (a) an amount of alkali about equivalent to the quantity of epihalohydrin employed therein,
 (c) further reacting the product of step (b) forming the condensation product, and
 (d) reacting the condensation product of step (c) with sufficient alkylene oxide to react with all of the active hydrogens in the product.

More specifically the products are produced by reacting a desired ratio of amine and epihalohydrin at a temperature range from about 25° C. to about 140° C., preferably from about 50° C. to about 100° C. The time of reaction may vary from 0.5 hour to about 3 hours, however, the reaction is generally complete within about 1 hour. Upon completion of this reaction, an alkaline solution is added to the reaction mixture. The alkaline solution may be prepared from sodium hydroxide, potassium hydroxide, or lithium hydroxide. Strongly basic amines as for example, isopropylamine or ethylene diamine may also be employed. It is preferred, however, that either sodium hydroxide or potassium hydroxide are used in this epoxide formation step. The amount of alkali employed is equivalent to a slight excess of the amount of epihalohydrin employed. This amount is necessary to neutralize the acid formed from the halohydrin group. This reaction occurs at a temperature of from about 60°–150° C., preferably from about 90°–100° C. These amine condensation products can be oxyalkylated by the addition of alkylene oxide in the presence of an alkaline catalyst. Additional alkaline catalyst is added to the condensation products to catalyze the oxide addition. Sufficient alkylene oxide is then added to react with all of the active hydrogens in the product resulting in products having a molecular weight ranging from about 250 to about 600. The temperatures employed for the oxide addition may vary from about 45° C. to about 165° C. at atmospheric or superatmospheric pressures. Additional alkylene oxide may further be added to increase the molecular weight from about 600 to about 10,000. The procedures employed for the oxyalkylation reactions are well known to those skilled in the art and further clarification is not deemed necessary. The alkylene oxides which may be employed are selected from the group consisting of ethylene oxide, propylene oxide, butylene oxide, styrene oxide, allyl glycidyl ether, or mixtures thereof.

The amine condensation products of this invention may be used as cross-linking agents in urethane-urea compositions such as those employed in cast-elastomers, integral skin foams, microcellular foams, etc. The oxyalkylated amine condensation products prepared in accordance with this invention may be employed in the preparation of urethanes for use in surface coatings, flexible and rigid foams and the like. Due to the high functionality which results from the use of components which contain multiple active hydrogen groups, together with the aromatic amine groups, these products may be usefully employed in the preparation of rigid polyurethane foams which are useful in the preparation of sandwich panels for insulating applications in home refrigerators and freezers, refrigerated trucks and other carries. Semiflexible foams useful in automotive crash pads, weather stripping and the like can be prepared from higher molecular weight polyols prepared from these condensation products. The oxyalkylated derivatives are also useful in the preparation of non-cellular urethane compositions such as those used in coatings, sealants, seamless flooring, elastomers and similar applications. Rigid foams prepared from the oxyalkylated amine condensation products exhibit improved humid aging properties compared to oxyalkylated amine products.

The polyurethane foams employed in the present invention are generally prepared by the reaction of the oxyalkylated product with an organic polyisocyanate in the presence of a blowing agent and optionally in the presence of additional polyhydroxyl-containing components, chain-ex ending agents, catalysts, surface-active agents, stabilizers, dyes, fillers and pigments. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4 and 2,6-tolylene diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4'-triphenylmethane triisocyanate, polymethylene polyphenylisocyanate and tolylene 2,4,6-triisocyanate; and the tetraisocyanates such as 4,4'-dimethyldiphenylmethane-2,2'-5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

The polyisocyanate may be used in an amount which provides an NCO/OH ratio from about 0.9:1 to 1.5:1, preferably an NCO/OH ratio from about 1.00:1 to 1.2:1. The NCO/OH ratio is defined as the ratio of total NCO equivalents to total active hydrogen equivalents (i.e., hydroxyl plus water).

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine, 1,4-cyclohexane-bis-(methylamine), ethylene diamine, diethylene triamine, N-(2-hydroxypropyl)ethylene diamine, N,N'-di(2-hydroxypropyl)ethylene diamine, piperazine, 2-methylpiperazine, morpholine, and dodecahydro-1,4,7,9b-tetrazaphenalene.

Any suitable catalyst may be used including tertiary amines, such as for example, triethylene diamine, N-methylmorpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. No. 2,846,408.

A wetting agent or surface-active agent is generally necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The following Examples are illustrative of the present invention and therefore are not intended in any way as a limitation on the scope thereof. Parts and percents are by weight unless otherwise indicated. These Examples illustrate the process for preparing the amine condensation products, the products thereof, their oxyalkylated derivatives and the polyurethane compositions produced therefrom.

EXAMPLE 1

A 3-liter flask equipped with stirrer, thermometer, condenser and addition funnel was charged with 717 grams of crude methylenedianiline. The polyamine was heated to a temperature between 64 and 78° C. and 92.5 grams of epichlorohydrin was added over a two hour period. Upon completion of the addition, the reaction mixture was stirred for one hour at temperatures of about 39° C. and 40 grams of sodium hydroxide dissolved in 72 milliliters of water was added to the reaction mixture over a period of about one hour at temperatures ranging between 66 to 70° C. The mixture was allowed to react for one hour at a temperature of 78 to 82° C. and then the addition of 790 grams of propylene oxide was begun at a temperature of 112° C. The oxide addition took approximately 16 hours, while the temperature ranged between 48° and 107° C. Upon completion of the oxide addition the reaction mixture was stirred at 70 to 109° C. for five hours. 1.3 grams of potassium hydroxide was added to the reaction mixture and water was stripped off at temperatures of 148 to 160° C. at 2 to 4 millimeters of mercury pressure. Additional propylene oxide, 730 grams, was added over a period of 24 hours at temperatures ranging from 117 to 161° C. Upon completion of the second addition, the reaction mixture was stirred at a temperature of about 150° C. for two hours. Subsequently 1.335 grams of 85 percent phosphoric acid was added to neutralize the catalyst. The reaction mixture was filtered through a Buchner funnel at 110° C. to remove the salts. The resulting filtrate was stripped at 120° C. for one hour at 1 millimeter mercury pressure. The resulting product had a hydroxyl number of about 358 corresponding to a molecular weight of 1035, assuming a functionality of 6.6.

EXAMPLE 2

A 3-liter flask equipped with stirrer, thermometer, condenser, and addition funnel was charged with 557.7 grams to toluene diamine. A quantity of epichlorohydrin, 141 grams, was added over a period of approximately two hours at temperatures ranging from 44 to 130° C. The reaction mixture was stirred for half an hour at a temperature of 140° C. Upon cooling the reaction mixture, 61 grams, of sodium hydroxide dissolved in 16 milliliters of water was added and the mixture allowed to react at a temperature of 113° C. for one hour. After allowing the reaction mixture to stand overnight, 995 grams of propylene oxide was added over a 24 hour period at temperatures ranging from 99 to 180° C. Upon completion of this addition, the reaction mixture was stirred for one hour at reflux temperatures then 1.15 grams of potassium hydroxide was added. Subsequently, water was stripped from the reaction mixture at temperatures of 128° C. at 1 millimeter of mercury pressure over a period of approximately two hours. A quantity of propylene oxide, 905 grams, was added at temperatures ranging from 71 to 176° C. over a period of approximately 96 hours. The reaction mixture was allowed to react at 156° C. for 16 hours. The catalyst was then neutralized with 1.04 grams of 85 percent phosphoric acid, and the reaction mixture stripped at temperature ranging from 126 to 144° C., and 1 millimeter mercury pressure, for two hours. The resulting product had a hydroxyl number of 413 which corresponds to a molecular weight of about 750 assuming a functionality of 5.5.

EXAMPLE 3

A 500 milliliter flask equipped with stirrer, thermometer, condenser, and addition funnel was charged with 99 grams of methylene dianiline. The amine was heated to a temperature of approximately 90° C. and 46.25 grams of epichlorohydrin was added at temperatures ranging from 70 to 110° C. over a period of approximately 45 minutes. Subsequently, the reaction mixture was stirred at temperatures ranging from 74 to 78° C. for one hour. 125 milliliters of benzene were then added. The mixture was cooled to approximately 40° C.

and over a time period of 25 minutes, 105 grams of diethanolamine was added. After the addition, the reaction mixture was heated at reflux temperatures of 80° C., for one and a half hours. Potassium hydroxide, 28.05 grams, dissolved in 30 mils of distilled water was added to the mixture. Water was then removed by azeotropic distillation at a temperature of 72 to 83° C. Benzene was then removed by stripping by heating the reaction mixture to a temperature range of 76 to 102° C. at 17 millimeters mercury pressure. Propylene oxide, 261 grams, was added during a period of 16 hours at temperatures ranging from 90 to 132° C. The reaction mixture was then stirred at 132° for 8 hours. The resulting product had a hydroxyl number of 518, which corresponds to a molecular weight of 715, assuming a functionality of 6.6.

EXAMPLE 4

A 1-liter flask equipped with stirrer, thermometer, condenser, and addition funnel was charged with 157.5 grams of diethanolamine. Epichlorohydrin, 46.25 grams, was added to the reaction flask at temperatures ranging from 26 to 80° C. over a period of about one hour and 20 minutes. The reaction mixture was then stirred at temperatures ranging from 75 to 80° C. for one hour and 45 minutes. Sodium hydroxide, 20 grams, dissolved in 25 milliliters of water, was added at a temperature of 80° C. The reaction mixture was then stirred for one hour at temperatures ranging from 65 to 80° C. 232 grams of propylene oxide was added at temperatures ranging from 65 to 95° C. during nine and a half hours. The reaction mixture was then stirred for one half hour at 90° C. and volatiles was stripped off at a temperature range of 90 to 106° C. at less than 1 millimeter of mercury pressure. The resulting product had a hydroxyl number of 584 which corresponds to a molecular weight of 388, assuming a functionality of 4.

EXAMPLE 5

Foam A was prepared using the propylene oxide adduct of the amine condensation product prepared in Example 1.

Foam B was prepared using the propylene oxide adduct of the amine condensation product prepared in Example 2.

Foam C was prepared using the propylene oxide adduct of toluene diamine having a molecular weight of about 575.

Foam D was prepared using the propylene oxide adduct of crude methylene dianiline having a molecular weight of about 785.

Foam E was prepared using the propylene oxide adduct of the amine condensation product prepared in Example 3.

Foam F was prepared using the propylene oxide adduct of the amine condensation product prepared in Example 4.

The propylene oxide adducts of toluene diamine and crude methylene dianiline were prepared by procedures well known to those skilled in the art.

Hand-mixed rigid polyurethane foams were prepared using the formulations as listed. Physic 1 properties of the foams obtained are listed below in the Table.

The physical properties of the polyurethane foams were determined by the following ASTM tests:

| Tensile Strength | D-412 |
| Humid Aging | D-1564 |
| Yield Strength | D-1621 |

TABLE

| Ingredient: | A | B | C | D | E | F |
|---|---|---|---|---|---|---|
| Polyol, parts | 100 | 100 | 100 | 100 | 100 | 100 |
| Silicone Surfactant, parts | 1.5 | 1.5 | 1.5 | 1.5 | 1.5 | 1.5 |
| Tetramethylethylenediamine, parts | 2.0 | 2.0 | 2.0 | 2.0 | 2.0 | 2.0 |
| Trichlorofluoroethylene, parts | 35.3 | 33.2 | 35.5 | 32.8 | 41.5 | 44.3 |
| Polyphenylene polymethylene polyisocyanate, parts | 104.0 | 91.3 | 105.0 | 83.3 | 148.5 | 131.7 |
| Physical Properties: | | | | | | |
| Density, pcf. | 2.16 | 2.09 | 2.11 | 2.03 | 1.81 | 1.44 |
| Yield strength, psi. | | | | | | |
| 77° F | 47.1 | 44.4 | 44.1 | 41.5 | 31.0 | 14.1 |
| 150° F | 43.9 | 37.5 | 35.9 | 35.3 | 22.8 | 12.8 |
| 200° F | 39.1 | 35.3 | 30.3 | 30.9 | 22.7 | 12.6 |
| 250° F | 24.3 | 28.5 | 21.4 | 19.9 | 17.8 | 9.5 |
| Tensile strength, psi. | 86.6 | 75.6 | 83.2 | 78.0 | 27.7 | 38.8 |
| Closed cells, % | 91 | 93 | 90 | 92 | | |
| Flame test ASTM-D-1692 | burns | SX | burns | SX | SX | burns |
| Burning rate, in./min. | 7.4 | (1.3–1.5 in. burned) | 9.8 | (3.7–4.2 in. burned) | (3.2 in. burned) | 10.3 |
| Humid aging at 158° F and 100% R.H., % volume increase | | | | | | |
| 1 day | 4.9 | 4.6 | 9.8 | 7.4 | 4.5 | 3.4 |
| 2 days | 5.0 | 4.9 | 8.9 | 7.4 | 5.7 | 3.8 |
| 7 days | 6.1 | 6.0 | 15.6 | 10.1 | 4.6 | 6.7 |
| 14 days | 6.5 | 6.2 | 14.7 | 10.2 | 6.0 | 10.6 |
| 28 days | 8.6 | 8.2 | 18.1 | 12.5 | 7.7 | 14.2 |
| Dry heat aging at 250° F, % volume increase | | | | | | |
| 1 day | 8.5 | 7.4 | 23.2 | 19.3 | 2.8 | 3.6 |
| 2 days | 10.4 | 10.0 | 27.2 | 22.4 | 3.2 | 4.5 |
| 7 days | 17.4 | 17.5 | 50.4 | 34.4 | 30.3 | 18.6 |
| 14 days | 26.8 | 27.2 | 64.3 | 43.3 | 29.5 | 17.3 |
| 28 days | 46.9 | 42.7 | 47.8 | 21.0 | 28.6 | 10.2 |

The data in the Table indicates that the % volume increase upon Humid Aging is substantially less for the condensation products of the instant invention as compared to the prior art products. Thus, Foam D showed a volume increase of 12.5% whereas Foams A and E, prepared from the same amine and linked with epichlorohydrin, showed a volume increase of 8.6 and 7.7% respectively. Similarly, Foam C increased in volume by 18.1% whereas Foam B, prepared from the same amine and linked with epichlorohydrin showed a volume increase of 8.2%.

The embodiments of the invention in which an exclusive property or privilege is claimed are defined as follows:

1. A polyurethane cellular foam prepared by the reaction of an organic polyisocyanate and an oxyalkylated product in which the proportionate amounts of polyisocyanate and the oxyalkylated product provide an NCO/OH ratio from about 0.9:1 to 1.2:1, and in which the oxyalkylated product is prepared by the addition of an alkylene oxide selected from the group consisting of ethylene oxide, propylene oxide, butylene oxide, styrene oxide, allyl glycidyl ether, and mixtures thereof, to a condensation product in an amount sufficient to or greater than the amount necessary to react with all of the active hydrogens in the condensation product, said condensation product prepared by reacting in the presence of an alkaline catalyst at least 2 moles of an amine selected from the group consisting of aliphatic, olefinic, aromatic, alicyclic, alkyl aryl, alkyl alicyclic, alkyl heterocyclic and heterocyclic primary amines and secondary polyamines and alkanolamines with 1 mole of epihalohydrin and having a molecular weight from about 600 to about 10,000.

2. The foam of claim 1 wherein the epihalohydrin is selected from the group consisting of epihalohydrin, epibromohydrin and epiiodohydrin.

3. The foam of claim 1 wherein the mole ratio of amine to epihalohydrin is from about 2:1 to about 4:1.

4. The foam of claim 1 wherein the amine is selected from the group consisting of toluene diamine, ethylene diamine, crude methylene dianiline, phenylenediamine and diethanolamine.

5. The foam of claim 1 in which a substantial amount of the amine is an aromatic amine.

* * * * *